(Model.) 2 Sheets—Sheet 1.
S. E. FERGUSON.
COMBINED BEE SWARMER AND HIVER.
No. 316,349. Patented Apr. 21, 1885.
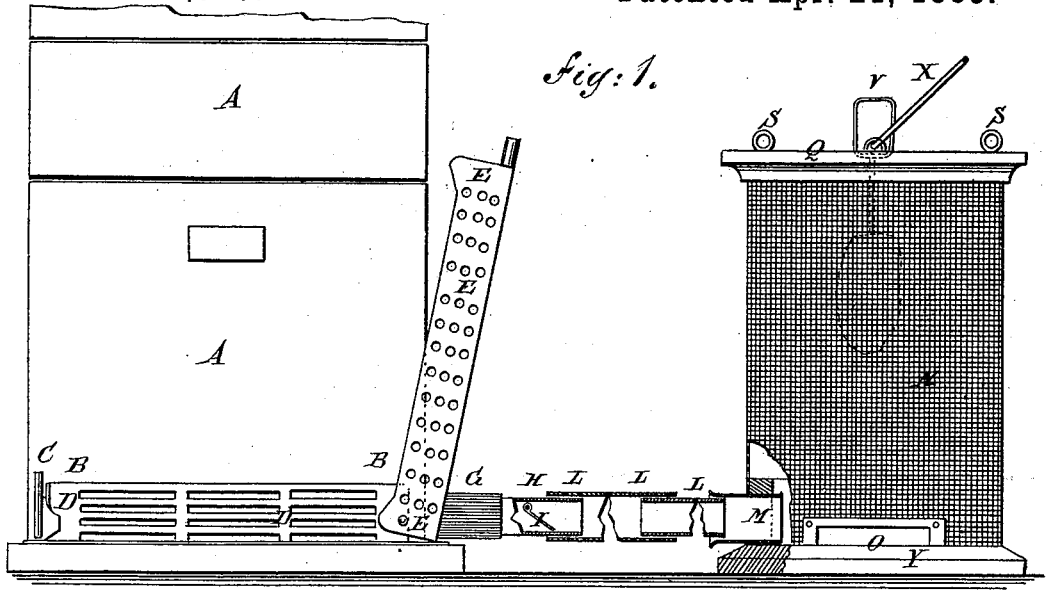
Fig. 1.
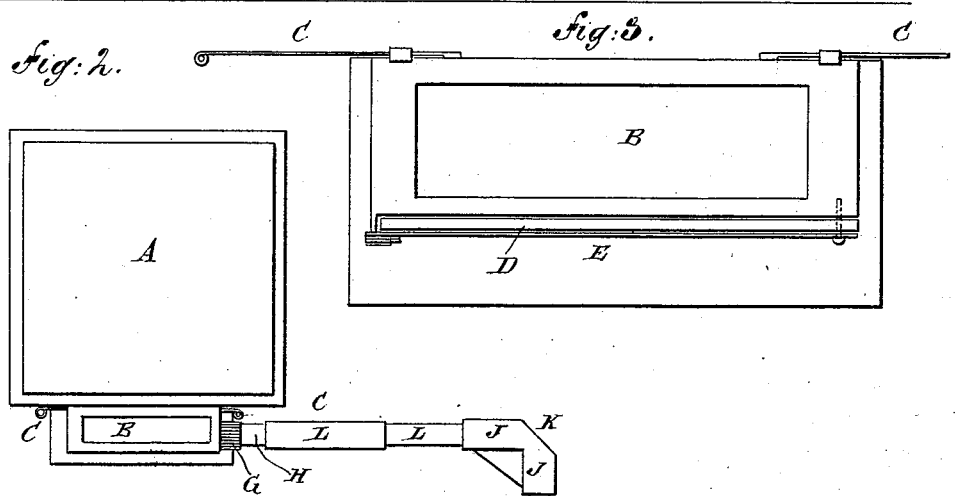
Fig. 2. Fig. 3.
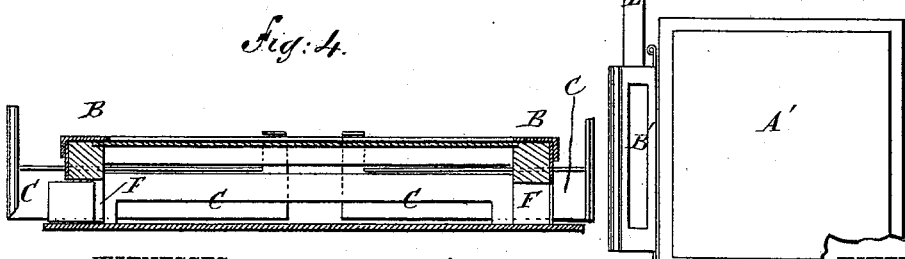
Fig. 4.
WITNESSES: Fig. 5. INVENTOR:
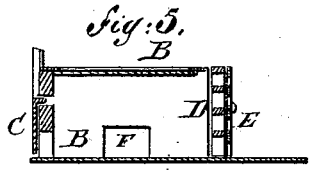
S. E. Ferguson
BY Munn & Co
ATTORNEYS.

(Model.) 2 Sheets—Sheet 2.
S. E. FERGUSON.
COMBINED BEE SWARMER AND HIVER.
No. 316,349. Patented Apr. 21, 1885.
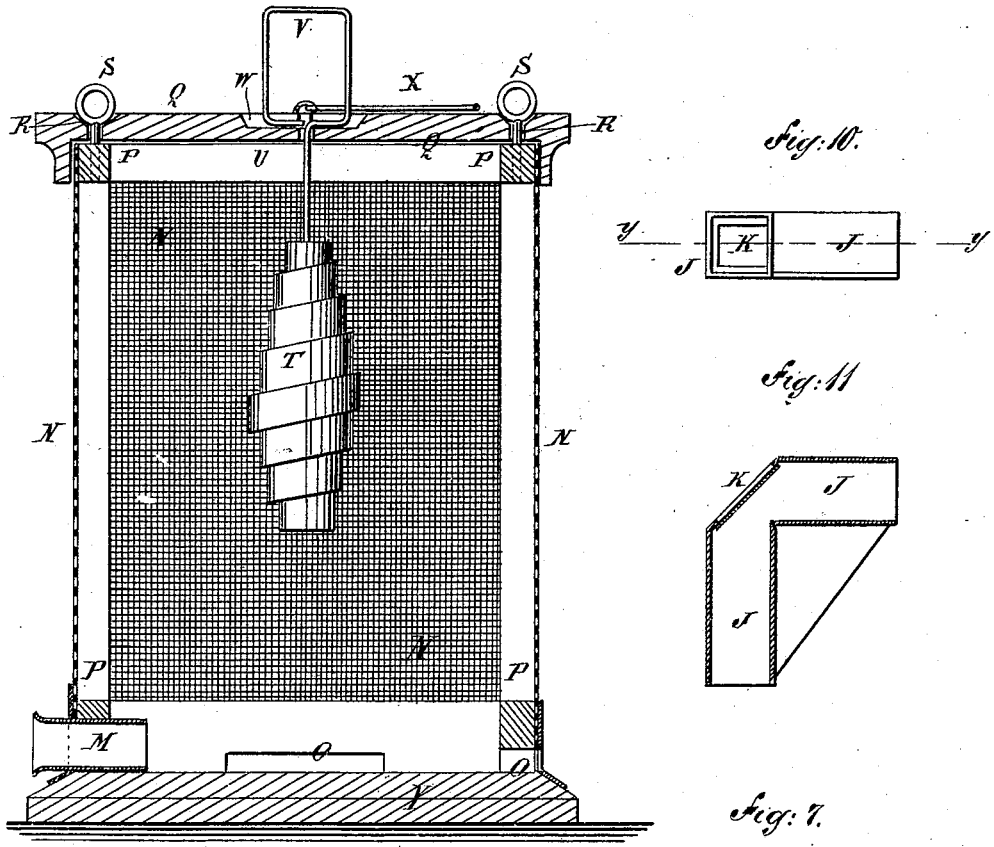
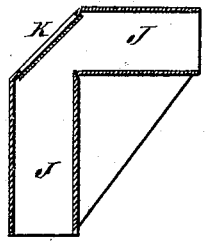
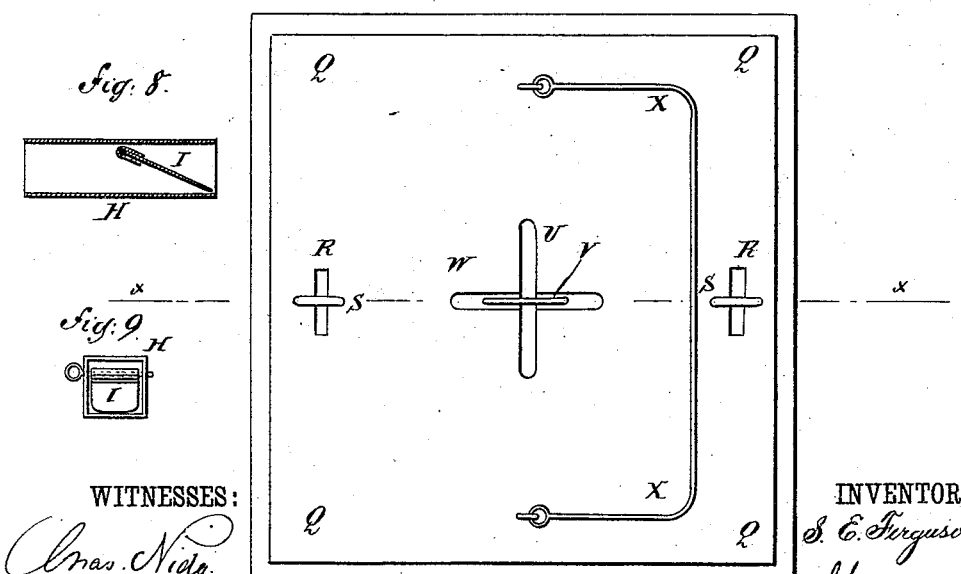
WITNESSES:
INVENTOR:
S. E. Ferguson
BY Munn & Co.
ATTORNEYS.

UNITED STATES PATENT OFFICE.

SYLVESTER E. FERGUSON, OF EUREKA SPRINGS, ARKANSAS, ASSIGNOR TO HIMSELF AND AUSTIN McCARTNEY, OF SAME PLACE.

COMBINED BEE SWARMER AND HIVER.

SPECIFICATION forming part of Letters Patent No. 316,349, dated April 21, 1885.

Application filed July 10, 1884. (Model.)

*To all whom it may concern:*

Be it known that I, SYLVESTER E. FERGUSON, of Eureka Springs, in the county of Carroll and State of Arkansas, have invented certain new and useful Improvements in Combined Bee Swarmers and Hivers, of which the following is a full, clear, and exact description.

Reference is to be had to the accompanying drawings, forming part of this specification, in which similar letters of reference indicate corresponding parts in all the figures.

Figure 1, Sheet 1, is a front elevation of my improvement, partly in section, and parts being broken away. Fig. 2, Sheet 1, is a plan view showing the cluster-cage replaced by a hive. Fig. 3, Sheet 1, is a plan view of the queen-trap. Fig. 4, Sheet 1, is a sectional front elevation of the same. Fig. 5, Sheet 1, is a sectional end elevation of the same. Fig. 6, Sheet 2, is a sectional side elevation of the cluster-cage, taken through the line $x\ x$, Fig. 7. Fig. 7, Sheet 2, is a plan view of the same. Fig. 8, Sheet 2, is a sectional side elevation of the door-section of the conductor. Fig. 9, Sheet 2, is an end elevation of the same. Fig. 10, Sheet 2, is a side elevation of an elbow-section of the conductor. Fig. 11, Sheet 2, is a sectional plan view of the same, taken through the line $y\ y$, Fig. 10.

The object of this invention is to provide means for conveniently controlling the swarming and hiving of bees.

The invention consists in a combined bee swarmer and hiver constructed with a trap provided with slides, a slotted door, and a perforated door for controlling the passage of the bees and drones and prevent the escape of the queen, a conductor formed of a wire-gauze first section to admit light, a section having a transparent drop-door for preventing the return of the queen, and connecting-sections, and a cluster-cage formed of a wire-gauze wall supported by a frame and provided with a bottom, a slotted and grooved separable top and its fastening eye-screws, and a cluster-block having a handle, whereby the escape of swarming bees can be prevented, as set forth.

A represents an ordinary bee-hive, at the entrance of which is placed a trap, B.

In the rear side of the trap B is formed an entrance, through which the bees pass to and from the hive A, and the size of which is regulated by slides or gates C, sliding in keepers at the said rear side of the trap. The slides C can be adjusted to leave the entrance fully or partly open, or to wholly close it, as may be desired. By adjusting the slides C so that only one bee can pass at a time, the bees can readily guard the hive against robber-bees.

The front of the trap B is provided with a bar door, D, the bars of which are at such a distance apart that the working-bees can pass between them, but not the queen, and with a perforated door, E, the perforations of which are of such a size that only the working-bees can pass through them, so that the said device can be used as a trap to prevent the queen from escaping, and as a guard to exclude the drones. The doors D E are hinged at one end to the body of the trap B, so that they can be swung open and shut through vertical planes, as indicated in Fig. 3 and illustrated in Fig. 1.

In one or both ends of the trap is an opening, F, to receive the end of the conductor, the first length, G, of which is made of wire-gauze to admit light, so that the queen-bee can readily find her way into the said conductor, thinking that she has found a way of escape from the trap. The second length, H, of the conductor is provided with a drop door or doors, I, made of mica, glass, or other suitable transparent material to transmit light, so that the queen, in seeking to escape, will raise and pass the said door or doors, and will thus be prevented from returning. The conductor can be arranged in a straight line, as shown in Fig. 1, or it can be made with one or more elbow lengths or sections, J, as shown in Fig. 2, so that the said conductor can be led in any desired direction. In this case the salient angle of each elbow length is truncated, and in the opening thus formed is secured a plate, K, of mica, glass, or other suitable transparent material to admit light, so that the queen can readily find her way around the angle of the elbow. The other lengths, L, of the conductor are made straight. The lengths G H J L are made alternately larger and smaller, or with one end larger than the other, so that the adjacent ends of the said lengths can be connected by slipping one into the other, as shown in Fig. 1.

When the bees are to be allowed to cluster, the other end of the conductor G H J L is inserted in a corresponding-shaped tubular entrance, M, in the lower part of the wall N of the cluster-cage. The lower part of the wall N has a number of entrances, O, formed through it, so that the bees can readily enter the said cage.

The wall N of the cage is formed of wire-gauze, attached at its upper and lower ends to frames P. The wall N of the cage, or the lower frame, P, is permanently attached to a bottom, Y. The top Q of the cage has slots R formed near its edges to receive set-screws S, screwed into the top frame, P, so that the said top Q can be secured in place by turning the eyes of the said screws S at right angles with the slots R, as shown in Figs. 6 and 7, and can be released by turning the said eyes into line with the said slots.

T is the cluster-block, which is so formed as to give the bees a firm hold upon it, and which may be made to represent a cluster of bees. The stem or handle of the cluster-block T passes up through a slot, U, in the middle part of the top Q, and has a loop, V, formed upon its upper end. The lower part of the loop V is at right angles with the stem of the cluster-block T, so that the said cluster-block can be supported by turning the loop V one-quarter around, so that its lower part will rest in a groove, W, formed in the top Q at right angles with the slot U. The loop V also serves as a handle for carrying the cluster-block T.

To the top Q is hinged a bail, X, by means of which the cluster-cage can be conveniently carried.

In using the apparatus, the queen-trap B is placed in front of the entrance to a hive, A, and the door E is raised so that the working-bees and drones can pass out of and into the said hive A; but the queen cannot leave the hive A to lead away a swarm, as she cannot pass out through the door D. The queen in seeking to escape from the trap B sees light entering through the wire-gauze section G of the conductor, and passing through the said section into section H she sees light through the transparent door or doors I, and in trying to reach it she raises the said door, passes through, and cannot return, and is compelled to pass on through the said conductor into the cluster-cage N P Y Q, calling the bees after her by her "piping." As the bees enter the cage they cluster upon the block T, and can then be readily transferred to a hive.

If desired, the outer end of the conductor can be connected by a second trap, B', with a second hive, A', as illustrated in Fig. 2, so that the bees will pass at once into the said second hive.

By using this apparatus the escape of swarms can be guarded against, so that the bees will not need to be constantly watched during the swarming season.

Having thus described my invention, what I claim as new, and desire to secure by Letters Patent, is—

1. In a bee swarmer and hiver, the combination, with a bee-hive, of a bee-trap having adjustable shutters to regulate the passage-ways for the bees, and to prevent the passage of the queen, a tubular conductor constructed to admit light, and provided with a hinged transparent door, and leading from said trap to a bee cage or hive having its ingress-openings arranged to permit the entrance of the working-bees, but to prevent the egress of the queen.

2. In a bee swarmer and hiver, the combination, with a bee-hive, of a trap provided with adjustable shutters to regulate the passage-ways for the bees and to prevent the passage of the queen, a conductor composed of straight and angular sections, one or more of the straight sections being illuminated, and the salient angles of the angular sections being also constructed to admit light, a transparent door within the conductor, the said conductor leading to a bee cage or hive having openings arranged to permit the entrance of the working-bees, but to prevent the egress of the queen, substantially as set forth.

3. A combined bee swarmer and hiver constructed substantially as herein shown and described, and consisting of the trap B C D E, the conductor G H L, and the cluster-cage N P O Y T, adapted to be used in connection with a bee-hive, as set forth.

4. In a combined bee swarmer and hiver, the trap B, constructed with slides C, a slotted door, D, and a perforated door, E, substantially as herein shown and described, to adapt it to be used in connection with a bee-hive, as set forth.

5. In a combined bee swarmer and hiver, the combination, with the trap B C D E, of the conductor G H L, substantially as herein shown and described, whereby the queen can be conducted from the trap B into a cluster cage or hive, as set forth.

6. In a combined bee swarmer and hiver, the conductor constructed substantially as herein shown and described, and consisting of the wire-gauze section G, to admit light to the entrance of the conductor, the section H, having transparent drop-door I to admit light and to prevent the return of the queen, the elbow-section J, having transparent plate K to allow the direction to be changed, and the sections L, as set forth.

7. In a combined bee swarmer and hiver, the cluster-cage constructed substantially as herein shown and described, and consisting of the wire-gauze wall N, the frames P, the bottom Y, and the top Q, having slots R U and groove W, the eye-screws S, for securing the said top in place detachably, and the cluster-block T, having handle V, to adapt the said cage to be used in connection with the conductor and trap in swarming and hiving bees, as set forth.

SYLVESTER E. FERGUSON.

Witnesses:
E. S. Cox,
R. P. Pulliam, Jr.